3,209,055
POLYMERIC BLENDS OF VINYL CHLORIDE POLYMER WITH CHLORINATED OR SULFOCHLORINATED POLYETHYLENE HAVING IMPROVED RESISTANCE TO HEAT DISTORTION

Johan G. Hedberg, Newark, and Lowell M. Magner, Wilmington, Del., assignors to E. I. du Pont de Nemours and Company, Wilmington, Del., a corporation of Delaware
No Drawing. Filed May 23, 1962, Ser. No. 196,889
4 Claims. (Cl. 260—897)

This invention relates to new polymeric compositions and to slightly cross-linked blends of vinyl chloride polymers with chlorinated polyethylene or sulfochlorinated polyethylene which show marked improvement in resistance to deformation at elevated temperatures.

Vinyl chloride polymer is frequently plasticized with plasticizers which, while of low volatility, gradually migrate from the composition with age, particularly at elevated temperatures. It has been found that halogenated, particularly chlorinated and sulfochlorinated, polyethylene can be mixed with vinyl chloride polymer to give flexible thermoplastic compositions which do not require the use of plasticizers. However, these compositions suffer more from heat distortion than vinyl chloride polymer plasticized with the usual plasticizers. It is also more difficult to remove these sheets from a calender roll at process temperatures since the sheet has rather low strength.

It is an object of this invention to provide blends of vinyl chloride polymer with chlorinated or sulfochlorinated polyethylene which overcome the disadvantages of the previous blends but which retain the improvements realized by not using migrating plasticizers. A specific object of this invention is to provide slightly cross-linkable compositions containing these polymers and to provide a process for the preparation of slightly cross-linked blends therefrom, which blends exhibit improved stability and strength at elevated temperatures. Other objects will appear hereinafter.

These and other objects are accomplished by the slightly cross-linked blends of polymers obtained by heating at 160 to 190° C. for at least 3 minutes the composition which comprises (a) 55 to 40 parts by weight of vinyl chloride polymer, (b) 45 to 60 parts by weight of a sulfochlorinated polyethylene containing 0.1–3.0% sulfur and 20–50% chlorine or 45 to 60 parts by weight of a chlorinated polyethylene containing 25 to 50% chlorine, wherein (a) plus (b) total 100 parts, (c) 0.25 to 1.0 part by weight of an organic peroxide which is stable at temperatures below 125° C., and (d) 2 to 15 parts by weight of an acid acceptor. The new blends of vinyl chloride polymer with chlorinated or sulfochlorinated polyethylene exhibit improved properties, particularly resistance to heat distortion.

Solid polyvinyl chloride, i.e., having a high molecular weight, is used in this invention. Copolymers of vinyl chloride with other ethylenically unsaturated monomers are also suitable provided the vinyl chloride is the principal component, i.e., greater than 50% by weight. The term "vinyl chloride polymer" includes the homopolymer, polyvinyl chloride, and copolymers thereof with other ethylenically unsaturated monomers, representative examples of which are described in U.S.P. 3,006,889.

The chlorinated or sulfochlorinated polyethylene may be derived from either high density linear polyethylene or low density high pressure polyethylene. Preferably the polyethylene has a melt index between about 0.3 and 100. The chlorine content of the chlorinated polyethylene preferably should range between about 25 and 50% chlorine. The sulfochlorinated polyethylene preferably contains 0.1–3.0% sulfur and 20–50% chlorine. These percents are by weight.

It is desirable to use approximately equal parts by weight of the vinyl chloride polymer and the chlorinated or sulfochlorinated polyethylene in order to obtain flexible compositions having the improved properties. The exact ratio will depend on the particular vinyl chloride polymer and the specific chlorinated or sulfochlorinated polyethylene used. A variation of about ±10% in the concentration does not significantly affect the properties. However, if the proportion of chlorinated or sulfochlorinated polyethylene is appreciably less than about 45 parts per 55 parts by weight of vinyl chloride polymer, the composition is increasingly more rigid with increasing vinyl chloride polymer content. On the other hand, when the proportion of chlorinated or sulfochlorinated polyethylene is appreciably greater than about 60 parts per 40 parts by weight of vinyl chloride polymer, the character of vinyl chloride polymer becomes undesirably diluted.

The organic peroxides which are operable in this invention must be essentially stable at the temperature at which the materials are mixed. The desired composition range is 0.25 to 1.0 part based on the total weight of the peroxide per 100 parts of the polymers in the composition. It is generally possible to add the organic peroxides to the composition at a temperature between about 110° and 125° C. Consequently the organic peroxides should not decompose appreciably at temperatures below 125° C. However, the organic peroxide should decompose to yield free radicals at temperatures between about 160 and 190° C. Representative examples of peroxides which meet these qualifications are di-tertiary butyl peroxide, di-cumylperoxide, 2,5-dimethyl-2,5-di(tert. butyl peroxy) hexane and 2,5-di-methyl-2,5-di(tert. butyl peroxy) hexyne-3.

Acid acceptors normally used as stabilizers for vinyl chloride polymer are satisfactory for use in this combination. Typical acid acceptors are dibasic lead phthalate, tribasic lead maleate, magnesium oxide and lead oxide. About 2 to 15 parts by weight of the acid acceptor per 100 parts of the polymers in the composition are required. If insufficient acid acceptor is present, the free hydrogen chloride liberated causes discoloration and weakening of the blend while an excess of acid acceptor is of no value or merit and is an added expense and filler in the composition.

These compositions are prepared with the conventional machinery used in the rubber and plastic industry. It is usually desirable to mix the vinyl chloride polymer with chlorinated polyethylene or sulfochlorinated polyethylene first at the required temperature along with the acid acceptor and then to lower the temperature before the addition of the organic peroxide. The polymer composition can be masticated at appreciable lower temperatures than vinyl chloride polymer alone. Conventional machinery such as a roll mill or internal mixer such as a Banbury or Werner-Pfliederer mixer can be used for mixing the ingredients.

Alternatively, the chlorinated polyethylene or sulfochlorinated polyethylene may be masticated with organic peroxide and at least a part of the acid acceptor and heated to the raised temperature between 160° C. and 190° C. before adding the vinyl chloride polymer.

The composition containing the organic peroxide can be raised to reaction temperature either while the mass is being masticated or while it is at rest in a mold. From an optional standpoint, it is preferable to effect the heating while masticating on a roll mill or in an internal mixer. It is necessary to maintain the mixture at reaction temperature only long enough for the peroxide to decompose and partially cross-link the polymers. This happens quickly and five minutes is sufficient to effect the reaction. At the upper end of the temperature range, near 185–190° C., the reaction is over in about 3 minutes. The mass can be held at that temperature for longer times without detriment, but there is no appreciable improvement after 10 minutes. Alternatively, the components may be mixed simultaneously and processed directly, for example in an extruder where mixing time and temperatures are adequate.

The amount of peroxide which is used in this invention is only sufficient to produce partial or slight cross-linking. By this is meant that the compositions after heating are not cured in the normal sense, since they are still millable and can be molded. It is known that products which have been cured in the normal sense are no longer millable or moldable.

These improved compositions are useful for wire coating, for coating cloth or other substrates, film, and for the manufacture of molded and extruded forms. The new compositions have the particular value that when subjected to a distorting force at elevated temperatures, they resist deformation.

Representative examples illustrating the present invention are as follows. Parts and percents are by weight unless otherwise indicated. The stress strain properties are tested at 25° C. by American Society for Testing Materials test D–412 and the heat distortion by ASTM test D–1047.

*Example 1*

50 parts of a chlorinated linear polyethylene (prepared from polyethylene having a melt index of 4) containing 44% chlorine, 50 parts of a high molecular weight solid polyvinyl chloride (commercially available as "Geon" 101 EP), 12 parts of dibasic lead phthalate, and 0.5 part of calcium stearate are blended together on a roll mill at about 163–165° C. The mass is then cooled, while milling to about 120° C. and 0.25 part of 2,5-dimethyl-2,5-di-(tert. butyl peroxy)hexane is added and milled in. The mass is then heated, while milling, to about 177–178° C. for 5 minutes. The composition is then sheeted off the mill. From this sheet, slabs of 6 x 6 x 0.04 inches were molded by heating in a mold at 160° C. for 5 minutes.

A control sample was prepared in the same way, except the steps of peroxide addition and subsequent heating were omitted.

The properties of the two compositions are compared below:

|  | Control | Sample |
|---|---|---|
| Modulus at 100% elongation, lbs./sq. in | 1,850 | 1,975 |
| Tensile strength at break, lbs./sq. in | 2,125 | 2,600 |
| Elongation at break, percent | 200 | 200 |
| Heat distortion at 121° C., percent | 32.5 | 7.0 |

The treated blend is also tougher and more resistant to abrasion than the untreated control. Copper wire was coated with both samples by conventional extrusion procedure. The coated wire was subjected to a scraping test in which a razor blade, held perpendicular to the wire, is scraped back and forth while loaded with a total weight of 500 g. The number of back and forth motions is counted. On an average of several tests, the treated wire coating survived nearly three times as many scraping cycles as the untreated coating before wearing thru to the wire.

*Example 2*

The procedure of Example 1 is repeated using the polymers described therein and the following formulations in parts by weight; these compositions show the following properties:

|  | Control | A | B | C | D |
|---|---|---|---|---|---|
| Chlorinated polyethylene | 50 | 50 | 50 | 50 | 50 |
| Polyvinyl chloride | 50 | 50 | 50 | 50 | 50 |
| Dibasic lead phthalate | 12 | 12 | 12 | 12 | 12 |
| Calcium stearate | 1 | 1 | 1 | 1 | 1 |
| Soft clay | | | 25 | 50 | 25 |
| 2,5-dimethyl-2,5-di(tert. butyl peroxy)hexane (50% active) as 100% | | 0.25 | 0.5 | 1.0 | |
| Dicumylperoxide (40% active) as 100% | | | | | 0.5 |
| Modulus, 100%, p.s.i | 1,950 | 2,325 | 2,775 | | 2,925 |
| Tensile at break, lbs./sq. i | 2,525 | 3,125 | 3,000 | 3,325 | 3,050 |
| Elongation at break, percent | 210 | 210 | 160 | 90 | 120 |
| Heat distortion at 121° C., percent | 22.5 | 2.8 | 2.2 | 2.6 | 0 |

*Example 3*

50 parts of the chlorinated polyethylene of Example 1, 6 parts of dibasic lead phthalate, 0.5 part of calcium stearate and 0.5 part of 2,5-dimethyl-2,5-di(tert. butyl peroxy)-hexane (100%) are milled on a roll mill at 65–95° C. until homogeneously blended and then the mill is heated so that the mass is milled at 175–177° C. for 5 minutes. The mass is sheeted off the mill and let stand for a day.

A control sample is made similarly but omitting the peroxide.

The sample and the control are separately banded on the mill at 170–175° C. and then 50 parts of the polyvinyl chloride of Example 1 is added and the mixture blended until homogeneous. It is then sheeted off the mill and molded in a mold under pressure at 160° C. for 5 minutes to form 6 x 6 x 0.04 inch slabs.

The properties of the slabs are:

|  | Control | Sample |
|---|---|---|
| Modulus, 100%, lbs./sq. in | 1,850 | 2,150 |
| Tensile at break, lbs./sq. in | 2,175 | 2,450 |
| Elongation at break, percent | 170 | 150 |
| Heat Distortion at 121° C., percent | 42.1 | 0 |

*Example 4*

50 parts of a high molecular weight solid polyvinyl chloride, 50 parts of sulfochlorinated linear polyethylene (prepared from polyethylene having a melt index of 4) containing 0.86% sulfur and 36.0% chlorine, 10 parts of dibasic lead phthalate and 0.5 part of calcium stearate are blended together on a roll mill at 160 to 165° C. The mass is cooled, while milling, to about 120° C. and 0.25 part of 2,5-dimethyl-2,5-di(tert. butyl peroxy)hexane is added and milled in. The mass is then heated at 177 to 178° C., while milling, for 5 minutes. The mass is then taken off the mill and molded into slabs by heating in a 6 x 6 x 0.04 inches mold at 160° C. for 5 minutes. This is referred to as Sample A.

Two control samples are prepared, one of which (B) receives no peroxide and is not heat treated and the other (C) receives no peroxide but is milled at 177 to 178° C. for 5 minutes. Slabs are molded from each of these. The properties of these 3 samples are as follows:

|  | Sample A | Control B | Control C |
|---|---|---|---|
| Tensile strength at break, lb./sq. in | 1,500 | 1,275 | 1,475 |
| Elongation at break, percent | 100 | 220 | 170 |
| Heat distortion at 121° C., percent | 9.3 | 23.7 | 26.2 |

*Example 5*

40 parts of a high molecular weight polyvinyl chloride, 60 parts of sulfochlorinated linear polyethylene (prepared from polyethylene having a melt index of 4) containing 0.13% sulfur and 43.6% chlorine, 10 parts of dibasic lead phthalate, and 1 part of calcium stearate are blended on a mill at 160 to 165° C. and then cooled to about 120° C. There is then added 0.25 part of 2,5-dimethyl-2,5-di-(tert. butyl peroxy)hexane and the mass is milled for 5 minutes at 177 to 178° C. It is then sheeted off the mill at about 135° C. A control sample is made the same way except that no peroxide is added. Slabs are molded in a 6 x 6 x 0.04 inch mold for 5 minutes at 160° C. The samples show the following properties:

|  | Sample | Control |
|---|---|---|
| Tensile strength at break, lb./sq. in | 2,325 | 2,025 |
| Modulus at 100% elongation, lb./sq. in | 1,700 | 1,500 |
| Elongation at break, percent | 280 | 290 |
| Heat distortion at 121° C., percent | 7.7 | 31 |

The improved blends of this invention may in general contain any of the usual compounding ingredients in addition to those used in the preceding Examples 1 to 3, such as the usual pigments, reinforcing agents, plasticizers, fillers, and stabilizers.

It should be understood that substitution of vinyl chloride copolymers hereinbefore described for polyvinyl chloride in the Examples 1 to 3 will give substantially identical results and accordingly, this invention is not limited to the use of the homopolymer.

As many widely different embodiments of this invention may be made without departing from the spirit and scope thereof, it is to be understood that this invention is not limited to the specific embodiments thereof except as defined in the appended claims.

What is claimed is:

1. A process for the preparation of a polymeric blend which is resistant to distortion at elevated temperatures which process comprises heating at from 160 to 190° C. for at least 3 minutes a composition containing (a) 55 to 40 parts by weight of vinyl chloride polymer, (b) 45 to 60 parts by weight of a polymer selected from the group consisting of chlorinated polyethylene containing 25 to 50% chlorine and sulfochlorinated polyethylene containing 0.1–3.0% sulfur and 20–50% chlorine, wherein (a) plus (b) total 100 parts, (c) 0.25 to 1.0 part by weight of an organic peroxide which is stable at temperatures below 125° C., and (d) 2 to 15 parts by weight of an acid acceptor whereby said composition partially cures to a polymeric blend which is still millable and moldable.

2. A process for the preparation of a polymeric blend which is resistant to distortion at elevated temperatures which comprises heating at from 160 to 190° C. for at least 3 minutes a composition containing (a) 55 to 40 parts by weight of polyvinyl chloride, (b) 45 to 60 parts by weight of a polymer selected from the group consisting of chlorinated polyethylene containing 25 to 50% chlorine, and sulfochlorinated polyethylene containing 0.1–3.0% sulfur and 20–50% chlorine, wherein (a) plus (b) total 100 parts, (c) 0.25 to 1.0 part by weight of an organic peroxide which is stable at temperatures below 125° C. and (d) 2 to 15 parts by weight of an acid acceptor whereby said composition partially cures to a polymeric blend which is still millable and moldable.

3. A process of claim 2 wherein the organic peroxide is 2,5-dimethyl-2,5-di(tert. butyl peroxy)hexane.

4. The process of claim 2 wherein the acid acceptor is dibasic lead phthalate.

References Cited by the Examiner

UNITED STATES PATENTS 2,944,927  7/60  Dosmann _____ 260—884
3,006,889  10/61  Frey _____ 117—232

MURRAY TILLMAN, *Primary Examiner.*

LEON J. BERCOVITZ, *Examiner.*